United States Patent

Hofferber

[11] Patent Number: 4,769,056
[45] Date of Patent: Sep. 6, 1988

[54] DISTILLATION PRESSURE CONTROL

[75] Inventor: James A. Hofferber, Bartlesville, Okla.

[73] Assignee: Phillips Petroleum Company, Bartlesville, Okla.

[21] Appl. No.: 26,248

[22] Filed: Mar. 16, 1987

[51] Int. Cl.$^4$ .............................................. F25J 3/00
[52] U.S. Cl. .............................................. 62/37; 62/21; 203/2; 203/DIG. 18
[58] Field of Search .......... 62/21, 37; 203/2, DIG. 18

[56] References Cited

U.S. PATENT DOCUMENTS

| | | | |
|---|---|---|---|
| 2,844,160 | 7/1958 | Polk | 137/115 |
| 2,890,156 | 6/1959 | Vautrain | 202/160 |
| 2,988,894 | 6/1961 | Van Pool et al. | 62/37 |
| 3,049,886 | 8/1962 | Cabbage | 62/37 |
| 3,361,646 | 1/1968 | McMullan et al. | 62/37 |
| 3,939,045 | 2/1976 | Walker | 62/21 |
| 4,298,363 | 11/1981 | Campbell et al. | 62/21 |
| 4,371,426 | 2/1983 | Di Biano et al. | 62/37 |

Primary Examiner—Ronald C. Capossela
Attorney, Agent, or Firm—George E. Bogatie

[57] ABSTRACT

In a fractional distillation column wherein a split-range controller alternately manipulates a valve for flaring gas to decrease pressure and a valve for importing gas to increase pressure as required to maintain a desired distillation pressure, both flare gas and import gas are minimized by providing a valve position controller that slowly drives both of the control valves manipulated by the split-range controller toward a closed position while maintaining the desired distillation pressure.

14 Claims, 1 Drawing Sheet

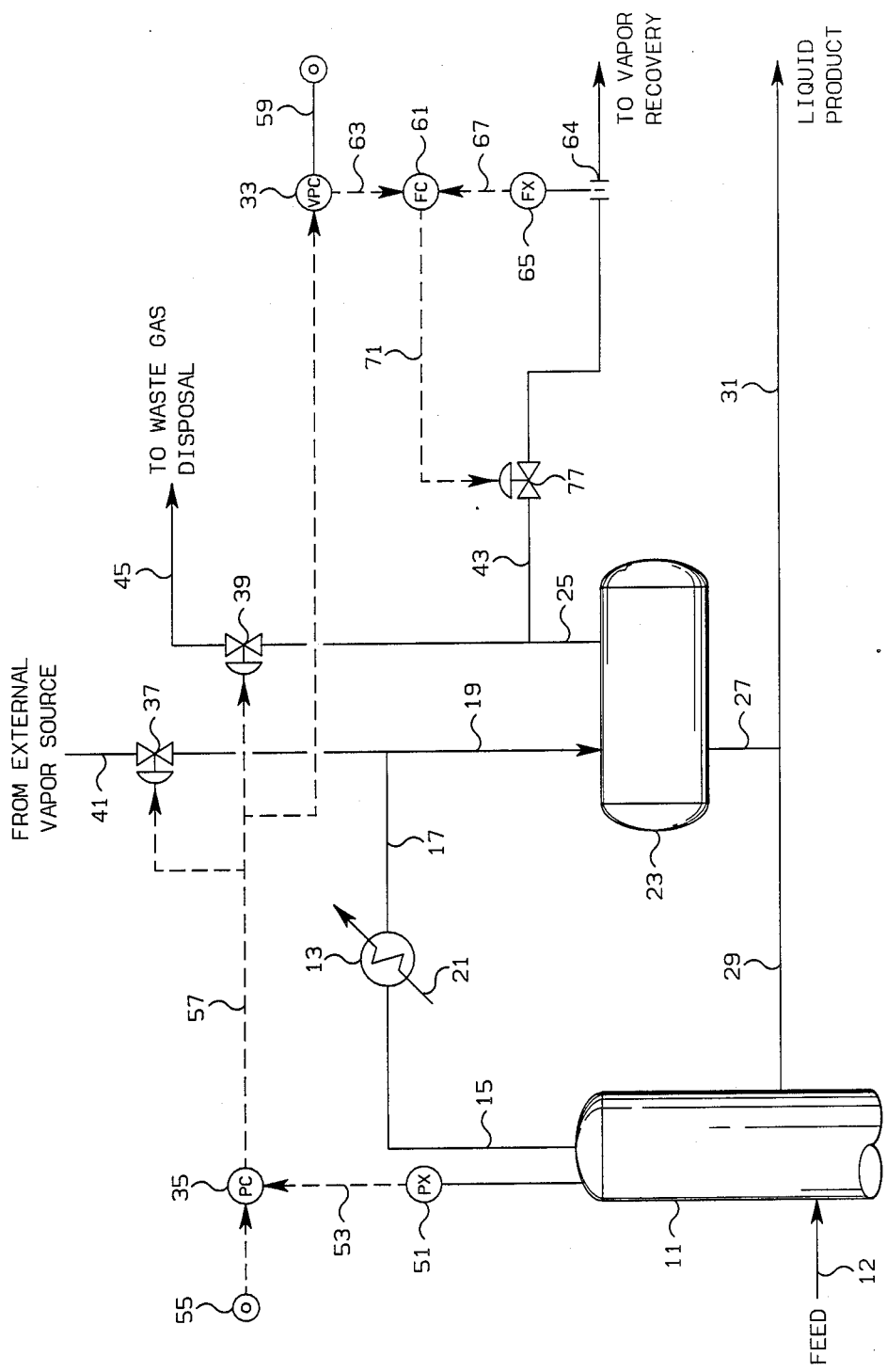

DISTILLATION PRESSURE CONTROL

This invention relates to automatic control of a fractional distillation column. In one aspect this invention relates to method and apparatus for maintaining a constant pressure in a fractional distillation column.

Most fractional distillation columns are operated with constant pressure control. Constant pressure is desirable in fractional distillation columns since maintaining constant pressure allows process variables, which are sensitive to pressure, to be utilized to infer values of other process variables. For example, temperature which is sensitive to pressure change can be directly utilized under certain conditions to infer a product composition in a fractional distillation column. Therefore, constant pressure control eliminates the need to provide compensation for pressure variations when utilizing inferred variables.

One method of achieving high speed column pressure control, which involves alternating between a pressure increasing operation and a pressure decreasing operation, is to vent gas to a waste gas disposal unit such as a flare and to import gas from an external source in response to the actual distillation pressure. This type of control is typically accomplished with a split range control signal. This means that when the actual distillation pressure is above the desired set point pressure such that the split range control signal is high, e.g. 9 to 15 PSIG for a controller having a full range of 3–15 PSIG, pressure decreasing is achieved by venting gas through a modified control valve. The valve is modified so that instead of modulating from closed to fully open for the full scale output of the controller, it is made to operate over one-half the control signal range such that the valve is closed for a signal in the 3 to 9 PSIG range but fully open at 15 PSIG. Conversely, if the distillation pressure is below this desired set point pressure such that the split range control signal is low, e.g. 3 to 9 PSIG, pressure increasing is achieved by admitting gas through a modified control valve that is fully open at 3 PSIG and closed in the 9–15 PSIG range.

One implication of such a split-range operation is that a signal level near 9 PSIG can cause the system to be unstable and cycling. Since this is the point at which the pressure reducing valve is just beginning to open and the pressure increasing valve is closed, the minimum flow through the pressure reducing valve could drop the pressure sufficiently to cause the pressure increasing valve to open. To remedy the aforementioned problem a slight dead band is desirable which offsets the beginning of pressure reducing and the termination of pressure increasing, so that they will not both occur at 9 PSIG.

While distillation pressure control which requires both venting gases to flare and importing gases from external sources is highly effective for precisely controlling the distillation pressure, it is wasteful of the gas that is flared and uneconomical in requiring imported gases. It is thus an object of this invention to control the distillation pressure in such a manner that an insignificant amount of flaring or importing of gases is required while maintaining the effective control provided by alternately venting gases to flare and importing gases from external sources. It is a further object of this invention to provide a control system that can manipulate a gas stream that is recovered from a flare line associated with the distillation column and passed to a lower pressure unit such as an absorber column or an LPG recovery unit.

In accordance with the present invention method and apparatus are provided for maintaining the position of two control valves manipulated by a split-range controller at or near their closed position. This is accomplished by providing a valve position controller having a set point equal to the mid-range value of the split-range controller output signal (e.g. 9 PSIG) and a process variable input representative of the position of the two control valves which is provided by the output signal of the split-range controller. The valve position controller, which is tuned to respond more slowly than the split-range controller, then manipulates the flow rate of a gas stream recovered from a flare line associated with the fractional distillation column so as to drive the output signal of the split-range controller toward its mid-range value.

This results in efficient operation of the column since if the split-range controller output is maintained at mid-range, neither flaring nor importing of gas is required. As previously indicated for a one-half range split of the controller output signal both control valves associated with the split range controller will be closed at the mid-range value. Since the valve position controller is tuned to respond more slowly than the split-range controller, the high speed advantage of the split range controller and the fuel recovery advantage of the valve position controller are both maintained. Thus a distillation pressure disturbance will initially be compensated by the split-range controller, however, the valve position controller will seek to return the control valves to a closed position.

Other objects and advantages will be apparent from the foregoing brief description of the invention and the claims as well as the detailed description of the drawing which is a diagrammatic illustration of a column pressure control with the valve position system of the present invention.

The invention is illustrated and described in terms of a particular configuration of a fractional distillation column for distilling crude oil. However, the problem of controlling pressure is broadly applicable to distillation operations in general. Therefore, the invention is applicable to any particular distillation process where gas is vented from the distillation column in order to control pressure in the distillation column.

A specific control system configuration is set forth in the figure for sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors and the signals provided to control valves will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The controllers shown may utilize the various modes of control such as proportional, proportional-integral, proportional-derivative, or proportional-intergral-derivative. In this preferred embodiment, proportional-integral-deravitive controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of such gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one of more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirement of the particular installation, safety factors, the physical characteristics of the measuring or control instruments and other similar factors. For example, a raw flow measurement signal produced by a differential pressure orifice flow meter would oridinarily exhibit a generally proportional relationship to the square of the actual flow rate. Other measurements instruments might produce a signal which is proportional to the measured parameter, and still other transducing means may produce a signal which bears a more complicated, but known, relationship to the measured parameter. In addition, all signals could be translated into a "suppressed zero" or other similar format to provide a "live zero" and prevent an equipment failure from being interpreted as a low (or high) measurement or control signal. Regardless of the signal format or the exact relationship of the signal of the parameter which it represents, each signal representative of a measured process parameter or representative of a desired process value will bear a relationship to the measured parameter or desired value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawing, there is illustrated a fractional distillation column 11 which can be utilized for example to fractionate a crude oil feed supplied through conduit means 12 into a variety of products. For the sake of simplicity, however, only the overhead vapor product and the overhead liquid product are illustrated.

An overhead vapor stream is withdrawn from the fractional distillation column 11 through the combination of conduit means 15, condenser 13, conduit means 17, and conduit means 19. The condenser 13 is provided with a cooling medium flowing through conduit means 21. The partially condensed fluid stream from the condenser 13 is provided to the overhead accumulator 23 through the combination of conduit means 17 and conduit means 19. At least a portion of the fluid stream flowing through conduit means 19 which remains in the vapor form is withdrawn from the overhead accumulator 23 through conduit means 25. The liquid portion of the fluid stream flowing through conduit means 19 is withdrawn from the overhead accumulator 23 through conduit means 27. A portion of the fluid flowing through conduit means 27 is provided as an upper external reflex to fractional distillation column 11 through the combination of conduit means 27 and 29. The fluid flowing through conduit means 27 is also provided as a liquid product from the fractional distillation column 11 through the combination of conduit means 27 and 31.

A gas stream which is compatible with the overhead vapor stream withdrawn through conduit means 15 and which preferably consists essentially of ethane and propane is provided through the combination of conduit means 41, 17 and 15 to fractional distillation column 11 and through conduit means 41 and 19 through the accumulator 23.

At least a portion of the vapor withdrawn through conduit means 25 is provided to a lower pressure operating unit through conduit means 43 to recover gases that would otherwise be passed to flare. Also a portion of the vapor withdrawn through conduit means 25 is provided to flare through conduit means 45.

A valve position controller 33 in conjunction with a split-range pressure controller 35 is utilized to control the pressure in fractional distillation column 11 by manipulating: the position of control valve 37 which is operably located in conduit means 41 to supply import gas to fractional distillation column 11; the position of control valve 39 which is operably located in conduit means 45 to vent vapors to flare; and the flow rate of gas to a recovery unit through conduit means 43.

The pressure transducer 51 in combination with a pressure measuring device operably located in the upper portion of fractional distillation column 11 provides an output signal 53 which is representative of the distillation pressure in fractional distillation column 11 is provided as a first input to split-range pressure controller 35. The split-range pressure controller 35 is also provided with a set point signal 55 which is representative of the desired operating pressure for the fractional distillation column 11.

In response to signals 55 and 53 the split-range pressure controller 35 provides an output signal 57 which is responsive to the difference between signals 55 and 53 and which is representative of the position of control values 37 and 39 required to maintain the actual pressure represented by signal 53 substantially equal to the desired pressure represented by signal 55. Signal 57 is provided from split range pressure controller 35 as an input signal to valve position controller 33 and also as a control signal to pneumatic control valves 37 and 39. Pneumatic control valves 37 and 39 are adapted for a split-range operation such that control valve 37 is fully open at 3 PSIG and closed at 9 PSIG and control valve 39 is closed at 9 PSIG and fully open at 15 PSIG. The split-range pressure controller 35 manipulates valves 37 and 39 to thereby vary the flow of import gas to the fractional distillation column 11 and the flow of gas to flare so as to maintain a desired pressure in fractional distillation column 11.

The valve position controller 33, which is tuned to respond more slowly than split-range pressure controller 35, is provided with a set point signal 59 which is representative of the pressure which will hold pneumatic control valves 37 and 39 at their closed positions. As indicated previously, for a one-half range split of signal 57 (i.e. 3–9 and 9–15 PSIG) a mid-range value of 9 PSIG for signal 57 accomplishes this purpose. In response to signals 57 and 59 valve position controller 33 provides an output signal 63 which is responsive to the difference between signals 57 and 59. Signal 63 is provided as an input signal to flow controller 61. Therefore valve position controller 33 manipulates the set point of flow controller 61 so as to maintain a desired value for the position of control valves 37 and 39 as represented by signal 59.

Flow transducer 65 in combination with a flow sensor 64 which is operably located in conduit means 43 provides an output signal 67 which is representative of the flow rate of vapor flowing through conduit means 43. Signal 67 is provided as an input signal to flow controller 61. In response to signal 63 and 67 flow controller 61 provides an output signal 71 which is responsive to the difference between signal 63 and 67. The pneumatic control valve 77 is manipulated in response to signal 71 to thereby vary the flow rate of the vapors flowing through conduit means 43 so as to maintain the desired value for split-range control signal 57 which is represented by signal 59.

The essential feature of the valve position controller 33 is to minimize flaring of gas from the fractional distillation column 11 and the importing of gas to column 11 while maintaining the fast response provided by the split-range pressure controller 35. By way of example, if the pressure in the fractional distillation column 11 is to high, resulting in a value for signal 57 in the 9–15 PSIG range, control valve 39 immediately begins to open and reduce pressure by venting gas to flare through control valve 39. However, the change in signal 57 is sensed by valve position controller 33, and controller 33 responds by increasing the set point of flow controller 61. Flow controller 61 responds in turn by opening valve 77 which further reduces the pressure in fractional distillation column 11.

This further reduction in pressure is sensed by split-range controller 35, and controller 35 immediately begins to close valve 39 thus increasing the pressure in fractional distillation column 11. This control action continues until both set point signals 55 and 59 are satisfied. A completely analogous control action occurs if the pressure in fractional distillation column is too low whereby pneumatic control valves 37 and 77 are manipulated to maintain set point signals 55 and 59.

This invention has been described in terms of a preferred embodiment as illustrated in the figure. Specific components used in the practice of the invention as illustrated in the figure such as pressure transducer 51, pneumatic control valves 37, 39 and 77, proportional integral derivative controllers 33, 35 and 68 and flow transducer 65 are each well known commercially available control components such as are described at length in Perry's Chemical Engineers Handbook, 5th Edition, Chapter 22, McGraw-Hill.

For reasons of brevity conventional auxilary fractionation equipment required such as pumps, tanks, heat exchangers, additional conduits, additional measurement and control components, etc. have not been included in the above description since they play no part in the explanation of the invention. While the invention has been described in terms of the presently preferred embodiment, reasonable variations and modification are possible by those skilled in the control systems art within the scope of the described invention and the appended claims.

That which is claimed is:

1. Apparatus comprising:
   a fractional distillation column;
   means for providing a feed mixture to be fractionated to said column;
   means for withdrawing an overhead vapor stream from said column;
   means for condensing at least a portion of said overhead vapor stream;
   an accumulator;
   means for passing the resulting at least partially condensed overhead stream into said accumulator;
   means for withdrawing condensate from said accumulator and for passing a first portion of the thus withdrawn condensate into an upper portion of said column as an external reflux therefore and for passing a second portion of the thus withdrawn condensate as an overhead liquid product stream;
   means for withdrawing a first vapor stream from said accumulator and for passing a first portion of the thus withdrawn vapor through a first control valve to a vapor recovery unit and for passing a second portion of the thus withdrawn vapor stream through a second control valve to a waste gas disposal unit;
   means for providing a second vapor stream from an external source to said column through a third control valve wherein said second vapor stream is compatible with said first vapor stream;
   means for establishing a first signal representative of the actual pressure in said column;
   means for establishing a second signal representative of the desired pressure in said column;
   means for establishing a third signal responsive to the difference between said first signal and said second signal;
   means for manipulating said second control valve and said third control valve in response to said third signal to thereby maintain a desired pressure in said column;
   means for establishing a fourth signal representative of a desired position for said second control valve and said third control valve;
   means for establishing a fifth signal responsive to the difference between said third signal and said fourth signal, wherein said fifth signal responds more slowly to changes in said third signal and said fourth signal than said third signal is scaled to respond to changes in said first signal and said second signal; and means for manipulating said first control valve in response to said fifth signal to thereby maintain a desired position for said second control valve and said third control valve, wherein the manipulation of said first control valve in response to said fifth signal and the manipulation of said second control valve and said third control valve in response to said third signal results in substantially minimizing flow through said second control valve and said third control valve.

2. Apparatus in accordance with claim 1 wherein said means for manipulating said first control valve in response to said fifth signal comprises:

means for establishing a sixth signal representative of the actual flow rate to said vapor recovery unit;

means for establishing a seventh signal responsive to the difference between said fifth signal and said sixth signal wherein said seventh signal is scaled so as to be representative of the position of said first control valve required to maintain the actual flow rate of vapor to said vapor recovery unit equal to the flow rate represented by said fifth signal; and means for providing said seventh signal as a control signal to said first control valve.

3. Apparatus in accordance with claim 1 wherein said third signal is a split range control signal to maintain pressure in said column by alternating as required between a pressure increasing operation and a pressure decreasing operation in said column.

4. Apparatus in accordance with claim 3 wherein said second control valve and said third control valve are modified to essentially operate over one-half of the control signal range of their associated controller.

5. Apparatus in accordance with claim 4 wherein said means for manipulating said second control valve and said third control valve in response to said third signal additionally comprises:

means for offsetting the point at which said third control valve completely closes from the point at which said second control valve begins to open so that the closing of said third control valve will not coincide with the opening of said second control valve.

6. Apparatus in accordance with claim 1 wherein said vapor recovery unit in an LPG recovery unit.

7. Apparatus in accordance with claim 1 wherein said waste gas disposal unit is a flare to burn the gas released to control the pressure in said column.

8. A method for controlling the pressure in a fractional distillation column wherein a first vapor stream is withdrawn from an accumulator associated with said column and a first portion of the thus withdrawn first vapor stream is provided through a first control valve to a vapor recovery unit and a second portion of the thus withdrawn first vapor stream is provided through a second control valve to a waste gas disposal unit and further wherein a second vapor stream is provided through a third control valve to said column, said method comprising the steps of:

establishing a first signal representative of the actual pressure in said column;

establishing a second signal representative of the desired pressure in said column;

establishing a third signal responsive to the difference between said first signal and said second signal;

manipulating said second control valve and said third control valve in response to said third signal to thereby maintain a desired pressure in said column;

establishing a fourth signal representative of a desired position for said second control valve and said third control valve; and establishing a fifth signal responsive to the difference between said third signal and said fourth signal wherein said fifth signal responds more slowly to changes in said third signal and said fourth signal than said third signal responds to changes in said first signal and said second signal;

manipulating said first control valve in response to said fifth signal to thereby maintain a desired position for said second control valve and said third control valve, wherein manipulation of said first control valve in response to said fifth signal and the manipulation of said second control valve and said third control valve in response to said third signal results in substantially minimizing flow through said second control valve and said third control valve.

9. Method in accordance with claim 8 wherein said step for manipulating said first control valve in response to said fifth comprises:

establishing a sixth signal representative of the actual flow rate to said vapor recovey unit;

establishing a seventh signal responsive to the difference between said fifth signal and said sixth signal wherein said seventh signal is scaled so as to be representative of the position of said first control valve required to maintain the actual flow rate of vapor to said vapor recovery unit equal to the flow rate represented by said fifth signal; and providing said seventh signal as a control signal to said first control valve.

10. A method in accordance with claim 8 wherein said third signal is a split-range control signal to maintain pressure in said column by alternating as required between a pressure increasing operation and a pressure decreasing operation in said column.

11. A method in accordance with claim 10 wherein said second control valve and said third control valve are modified to operate over one-half of the control signal range of their associated controller.

12. A method in accordance with claim 11 wherein said step of manipulating said second control valve and said third control valve in response to said third signal additionally comprises:

offsetting the point at which said third control valve completely closes from the point at which said second control valve begins to open so that the closing of said third control valve will not coincide with the opening of said second control valve.

13. A method in accordance with claim 8 wherein said vapor recovery unit is an LPG recovery unit.

14. A method in accordance with claim 8 wherein said waste gas disposal unit is a flare to burn the gases released to control pressure in said column.

* * * * *